US009026838B2

(12) United States Patent  (10) Patent No.: US 9,026,838 B2
Hayashi  (45) Date of Patent: May 5, 2015

(54) COMPUTER SYSTEM, HOST-BUS-ADAPTOR CONTROL METHOD, AND PROGRAM THEREOF

(75) Inventor: Masayuki Hayashi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 13/489,805

(22) Filed: Jun. 6, 2012

(65) Prior Publication Data

US 2012/0331199 A1   Dec. 27, 2012

(30) Foreign Application Priority Data

Jun. 24, 2011   (JP) ................................. 2011-140897

(51) Int. Cl.
*G06F 11/16* (2006.01)
*G06F 13/10* (2006.01)
*G06F 13/38* (2006.01)

(52) U.S. Cl.
CPC ........... *G06F 13/102* (2013.01); *Y02B 60/1228* (2013.01); *G06F 13/385* (2013.01); *G06F 2213/0024* (2013.01); *G06F 2213/0026* (2013.01); *Y02B 60/1235* (2013.01)

(58) Field of Classification Search
CPC .. G06F 11/201; G06F 11/2005; G06F 3/0635
USPC ...................... 713/324; 714/4.1–4.5; 710/316
See application file for complete search history.

(56) References Cited

U.S. PATENT DOCUMENTS

| 6,065,081 A * | 5/2000 | Stancil et al. ................. 710/104 |
| 6,625,747 B1 * | 9/2003 | Tawil et al. .................. 714/6.22 |
| 6,708,278 B2 * | 3/2004 | Howard et al. ............... 713/323 |
| 6,779,064 B2 * | 8/2004 | McGowen et al. ........... 710/104 |

(Continued)

FOREIGN PATENT DOCUMENTS

| JP | 2004-185093 A | 7/2004 |
| JP | 2007-265243 A | 10/2007 |

(Continued)

OTHER PUBLICATIONS

PCI Bus Power Management Interface Specification, Revision 1.2, Mar. 3, 2004, pp. 41-45.

(Continued)

*Primary Examiner* — Paul R Myers
(74) *Attorney, Agent, or Firm* — Foley & Lardner LLP (57) ABSTRACT

A computer system includes: a first HBA that constitutes an operational path and on which a first PCI/PCIe-bus expansion card having a PCI PM function, which is a power saving function, is mounted; and a second HBA that constitutes a standby path and on which a second PCI/PCIe-bus expansion card having the PCI PM function is mounted; and a control section that controls the first HBA and the second HBA. The control section first uses the operational path by setting the first PCI/PCIe-bus expansion card to an active state. When a failure occurs in the operational path, the control section performs control such that communication recovery processing for the operational path is applied to the first HBA and further the second PCI/PCIe-bus expansion card of the second HBA is changed from a power saving state to which the second PCI/PCIe-bus expansion card has been first set, to an active state. When the communication recovery processing ends unsuccessfully, the control section performs communication with the I/O device by using the second PCI/PCIe-bus expansion card of the second HBA.

11 Claims, 5 Drawing Sheets

(56) References Cited

U.S. PATENT DOCUMENTS

| | | | |
|---|---|---|---|
| 6,823,477 B1* | 11/2004 | Cheng et al. | 714/26 |
| 6,904,477 B2* | 6/2005 | Padmanabhan et al. | 710/74 |
| 7,007,142 B2* | 2/2006 | Smith | 711/162 |
| 7,111,084 B2* | 9/2006 | Tan et al. | 710/15 |
| 7,222,348 B1 | 5/2007 | Athreya et al. | 719/321 |
| 7,307,948 B2* | 12/2007 | Infante et al. | 370/225 |
| 7,406,617 B1* | 7/2008 | Athreya et al. | 714/4.11 |
| 7,657,683 B2* | 2/2010 | Sridhar et al. | 710/260 |
| 7,962,771 B2* | 6/2011 | Song et al. | 713/300 |
| 7,992,039 B2* | 8/2011 | Belyakov et al. | 714/16 |
| 8,037,267 B2* | 10/2011 | Jinno et al. | 711/162 |
| 8,041,987 B2* | 10/2011 | Allen et al. | 714/5.11 |
| 8,074,009 B2* | 12/2011 | McGee et al. | 710/306 |
| 8,661,290 B2* | 2/2014 | Duron et al. | 714/11 |
| 8,694,826 B2* | 4/2014 | Myrah et al. | 714/6.3 |
| 2005/0138441 A1* | 6/2005 | Huffman et al. | 713/300 |
| 2005/0188239 A1* | 8/2005 | Golasky et al. | 714/2 |
| 2007/0297338 A1* | 12/2007 | Mou et al. | 370/242 |
| 2008/0126652 A1* | 5/2008 | Vembu et al. | 710/268 |
| 2009/0292932 A1* | 11/2009 | Oyama et al. | 713/310 |
| 2009/0300396 A1 | 12/2009 | Watanabe | |
| 2010/0050022 A1 | 2/2010 | Komatsu et al. | |

FOREIGN PATENT DOCUMENTS

| | | |
|---|---|---|
| JP | 2009-289193 A | 12/2009 |
| JP | 2010-198353 A | 9/2010 |

OTHER PUBLICATIONS

Working Draft, American National Standard, Project T10/1683-D, Revision 6, May 23, 2006, Information Technology—SCSI Architecture Model—4, pp. 94-100.

* cited by examiner

PRIOR ART

COMPUTER SYSTEM, HOST-BUS-ADAPTOR CONTROL METHOD, AND PROGRAM THEREOF

CLAIM OF PRIORITY

The present application claims priority from Japanese application JP 2011-140897 filed on Jun. 24, 2011, the content of which is hereby incorporated by reference into this application.

FIELD OF THE INVENTION

The present invention relates to a computer system, a host-bus-adaptor control method, and a program thereof. In particular, the present invention relates to, in a computer system in which a host computer and an I/O device are connected via redundant paths by using host bus adaptors on which PCI/PCIe-bus expansion cards are mounted, power saving control for the PCI/PCIe-bus expansion card mounted on the host bus adaptor that is provided in a standby path.

BACKGROUND OF THE INVENTION

In mission-critical computer systems, multiplexed (redundant) I/O paths to an I/O device, such as a storage system, are used in order to improve the reliability. Furthermore, among recent computer systems, a system in which a host computer and an I/O device are connected by using a PCI/PCIe-bus expansion card has been put into practical use. Regarding the multiplexing of an I/O path, for example, Japanese Unexamined Patent Application Publication Nos. 2004-185093 and 2007-265243 disclose technologies in which multiplexing an I/O path to a storage system improves the input-output performance, and, when a failure occurs, a normal logical path is selected to access a logical unit in the storage system.

Furthermore, in recent years, the speed of host bus adaptors (hereinafter, referred to as HBAs) in I/O paths in computer systems has been increased. This increase in speed can be realized by making the I/O paths redundant, but the redundant I/O paths may implement a higher performance than the required input-output performance. In such a case, it is desirable from the standpoint of power saving that only the devices in the minimum necessary I/O path (operational path) be operated in order to attain the required input-output performance, and the devices in the spare I/O path (standby path) be stopped.

However, to activate a device that has been stopped, for example, a host bus adaptor, a start time of several seconds to several tens of seconds is required to switch from the stopped state to a state in which communication can be performed. Thus, in the mission-critical computer systems, the technique in which the devices in the standby path are stopped cannot be used. In the mission-critical computer systems, if communication via the operational path cannot be performed, it is required that the communication be immediately continued via the standby path, and thus, a start time of several seconds to several tens of seconds is unacceptable.

Regarding power saving control for the standby path, Japanese Unexamined Patent Application Publication No. 2010-198353 discloses a computer system that includes a power supply control section for controlling power supply to HBAs connected to a plurality of paths. In the computer system, when the occurrence of an error with respect to a reissued I/O is detected, the standby path and the currently-being-used path are switched, and when a notification of time-out is received, the power supply control section stops power supply to the HBA in the standby path.

Furthermore, Japanese Unexamined Patent Application Publication No. 2009-289193 discloses a technology of reducing the power consumption of a device connected to a PCI/PCIe bus, by using the PCI PM (power management) function.

Furthermore, PCI Bus Power Management Interface Specification Rev. 1.2 Mar. 3, 2004 prescribes a PM function (power management function) serving as a power saving function for PCI/PCIe-bus expansion cards.

In the technology of Japanese Unexamined Patent Application Publication No. 2010-198353, the power supply control section, which controls power supply to the HBAs, performs power saving control for the standby path. However, many of computer systems that have been put into practical use do not include this type of power supply control section, so that it is difficult to immediately apply this technology thereto. In particular, Japanese Unexamined Patent Application Publication No. 2010-198353 does not suggest how power saving control for the standby path in a computer system that uses PCI/PCIe-bus expansion cards having the PCI PM function is performed.

Furthermore, Japanese Unexamined Patent Application Publication No. 2009-289193 proposes the technology of reducing the power consumption of a device connected to the PCI/PCIe bus, by using the PCI PM function. However, it does not suggest how the technology is applied to a computer system in which an HBA connected to the PCI/PCIe bus is used made redundant.

SUMMARY OF THE INVENTION

An object of the present invention is to achieve power saving for a standby path in a computer system in which multiplexed I/O paths are made for an I/O device by using PCI/PCIe-bus expansion cards having the PCI PM function.

More specifically, the object thereof is to perform control such that SCSI communication is immediately started by using the standby path that has been in a power saving state when a failure occurs in the operational path.

According to a first aspect, the present invention provides a computer system that performs data communication with an I/O device via host bus adaptors (HBAs) connected to the I/O device, the computer system including: as the HBAs, a first HBA that constitutes an operational path and on which a first PCI/PCIe-bus expansion card having a PCI PM function serving as a power saving function is mounted, and a second HBA that constitutes a standby path and on which a second PCI/PCIe-bus expansion card having the PCI PM function is mounted; and a control section that controls the first HBA and the second HBA, in which the control section first performs control such that the first PCI/PCIe-bus expansion card of the first HBA is set to an active state and the second PCI/PCIe-bus expansion card of the second HBA is set to a power saving state; when a failure occurs in the operational path, the control section performs control such that communication recovery processing for the operational path is applied to the first HBA and further the second PCI/PCIe-bus expansion card of the second HBA is changed from the power saving state to an active state; and, when the communication recovery processing ends unsuccessfully, the control section performs control such that communication is made with the I/O device by using the second PCI/PCIe-bus expansion card of the second HBA.

In the above-described computer system, it is preferred that a host computer that performs data communication with the I/O device by using a SCSI command be further included, and the control section concurrently perform the control of the communication recovery processing for the operational path and the control for changing the state of the standby path from the power saving state to the active state.

Furthermore, in the above-described computer system, it is preferred that, when a failure in the operational path is detected, the control section issue a task management request in the communication recovery processing for the operational path and activate the second HBA in the standby path, concurrently; and, when the task management request with respect to the operational path ends unsuccessfully, the control section perform communication with the I/O device via the second HBA by using a SCSI command.

Furthermore, in the above-described computer system, it is preferred that the control section set a PM state of the first PCI/PCIe-bus expansion card of the first HBA in the operational path to D0_Active; the control section set a PM state of the second PCI/PCIe-bus expansion card of the second HBA in the standby path to D3_hot; the control section perform communication with the I/O device via the first PCI/PCIe-bus expansion card of the first HBA in the operational path; when a problem occurs in the communication using the SCSI command via the operational path, the control section concurrently perform the control of the communication recovery processing for the operational path and the control for changing the PM state of the second HBA in the standby path to D0_Active; and, when the communication recovery processing for the operational path ends unsuccessfully, the control section perform communication with the I/O device by using the second PCI/PCIe-bus expansion card of the second HBA.

Furthermore, in the above-described computer system, it is preferred that, when a problem occurs in the communication using the SCSI command via the operational path, the control section concurrently perform the control of the communication recovery processing for the operational path and the control for changing the PM state of the second HBA in the standby path to D0_Active; when the communication recovery processing for the operational path ends successfully, the control section change the PM state of the second PCI/PCIe-bus expansion card of the second HBA from D0_Active to D3_hot; and the control section further perform communication with I/O device with a SCSI command by using the first PCI/PCIe-bus expansion card of the first HBA.

According to a second aspect, the present invention provides a host bus adaptor (HBA) control method used in a host computer that performs data communication with an I/O device by using a SCSI command via host bus adaptors (HBAs) connected to the I/O device, the host computer including: as the HBAs, a first HBA that constitutes an operational path and on which a first PCI/PCIe-bus expansion card having a PCI PM function serving as a power saving function is mounted, and a second HBA that constitutes a standby path and on which a second PCI/PCIe-bus expansion card having the PCI PM function is mounted; and a control section that controls the first HBA and the second HBA, the method including the steps of: first performing control, with the control section, such that the first PCI/PCIe-bus expansion card of the first HBA is set to an active state and the second PCI/PCIe-bus expansion card of the second HBA is set to a power saving state; when a failure occurs in the operational path, performing control, with the control section, such that communication recovery processing for the operational path is applied to the first HBA and further the second PCI/PCIe-bus expansion card of the second HBA is changed from the power saving state to an active state; and when the communication recovery processing ends unsuccessfully, performing control, with the control section, such that communication is made with the I/O device by using the second PCI/PCIe-bus expansion card of the second HBA.

In the above-described host bus adaptor (HBA) control method, it is preferred that, when a failure in the operational path is detected, the control section issue a task management request in the communication recovery processing for the operational path and activate the second HBA in the standby path, concurrently; and, when the task management request with respect to the operational path ends unsuccessfully, the control section perform communication with the I/O device via the second HBA by using a SCSI command.

Furthermore, in the above-described host bus adaptor (HBA) control method, it is preferred that the control section set a PM state of the first PCI/PCIe-bus expansion card of the first HBA in the operational path to D0_Active; the control section set a PM state of the second PCI/PCIe-bus expansion card of the second HBA in the standby path to D3_hot; the control section perform communication with the I/O device via the first PCI/PCIe-bus expansion card of the first HBA in the operational path; when a problem occurs in the communication using the SCSI command via the operational path, the control section concurrently perform the control of the communication recovery processing for the operational path and the control for changing the PM state of the second HBA in the standby path to D0_Active; and, when the communication recovery processing for the operational path ends unsuccessfully, the control section perform communication with the I/O device by using the second PCI/PCIe-bus expansion card of the second HBA.

Furthermore, in the above-described host bus adaptor (HBA) control method, it is preferred that, when a problem occurs in the communication using the SCSI command via the operational path, the control section concurrently perform the control of the communication recovery processing for the operational path and the control for changing the PM state of the second HBA in the standby path to D0_Active; when the communication recovery processing for the operational path ends successfully, the control section change the PM state of the second PCI/PCIe-bus expansion card of the second HBA from D0_Active to D3_hot; and the control section further perform communication with I/O device with a SCSI command by using the first PCI/PCIe-bus expansion card of the first HBA.

Furthermore, in the above-described host bus adaptor (HBA) control method, it is preferred that the PM states of the first and second HBAs be changed by rewriting registers (PMCSRs) in PCI CFG spaces generated on memories mounted on the first and second PCI/PCIe-bus expansion cards.

According to a third aspect, the present invention provides a program functioning as a host-bus-adaptor driver, executed on a host computer and controlling a first host bus adaptor (HBA) and a second HBA that are connected to an I/O device, the host computer including the first HBA that constitutes an operational path and on which a first PCI/PCIe-bus expansion card having a PCI PM function serving as a power saving function is mounted, and the second HBA that constitutes a standby path and on which a second PCI/PCIe-bus expansion card having the PCI PM function is mounted, and the host computer performing data communication with the I/O device using a SCSI command via the first HBA or the second HBA, in which the host-bus-adaptor driver first performs control such that the first PCI/PCIe-bus expansion card of the first HBA is set to an active state and the second PCI/PCIe-bus expansion card of the second HBA is set to a power saving state; when a failure occurs in the operational path, the host-bus-adaptor driver performs control such that communication recovery processing for the operational path is applied to the first HBA and further the second PCI/PCIe-bus expansion card of the second HBA is changed from the power saving state to an active state; and when the communication recovery processing ends unsuccessfully, the host-bus-adaptor driver performs control such that communication is made with the I/O device by using the second PCI/PCIe-bus expansion card of the second HBA.

According to the present invention, it is possible to realize power saving for the standby path by using the PCI PM function, in the computer system in which the multiplexed I/O paths are made for the I/O device by using PCI/PCIe-bus expansion cards having the PCI PM function. More specifically, it is possible to perform control such that SCSI communication is immediately started by using the standby path that has been in the power saving state when a failure occurs in the operational path.

DETAILED DESCRIPTION OF THE PREFERRED EMBODIMENTS

A preferred embodiment of the present invention will be described below with reference to the drawings.

Figure 1:
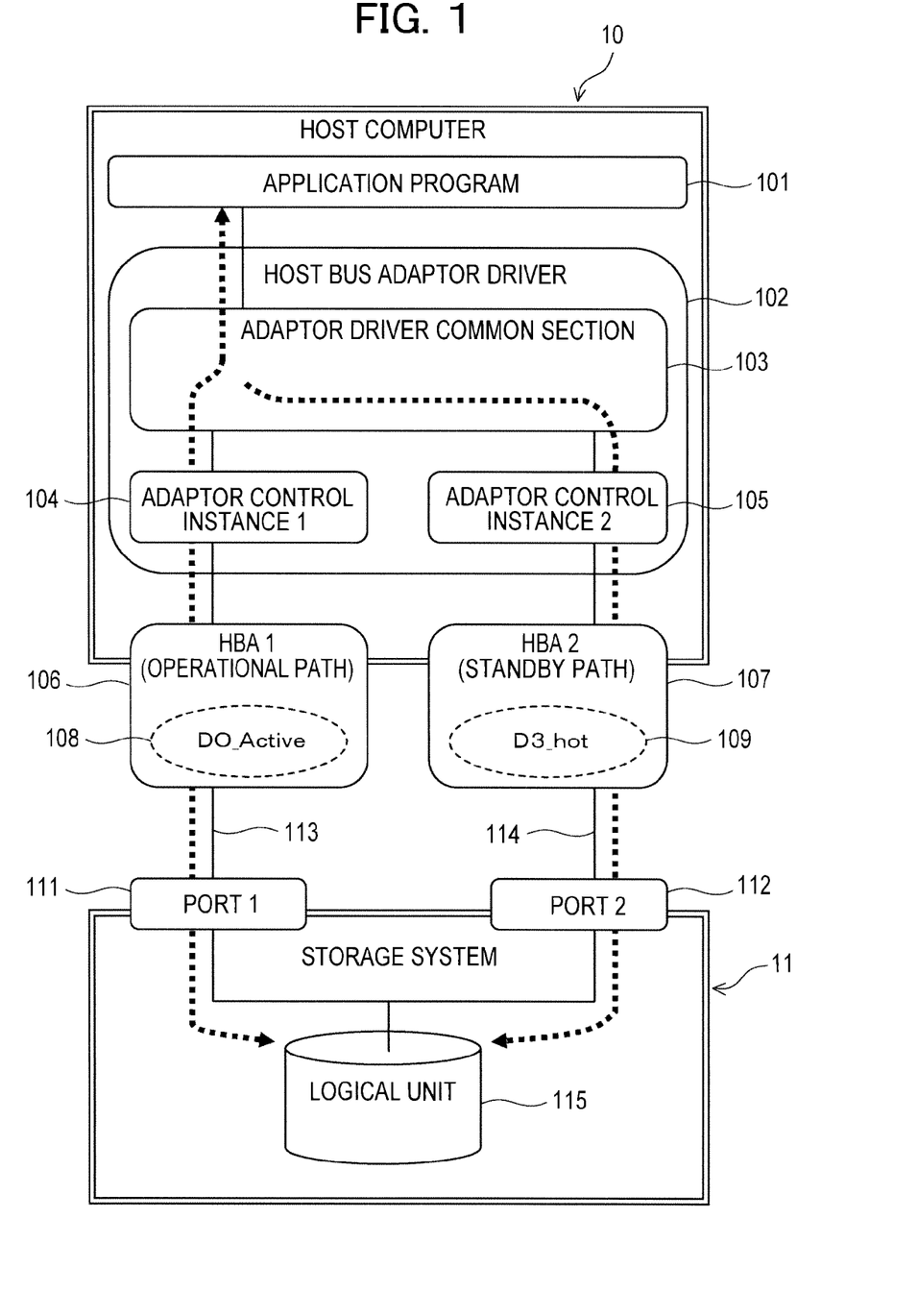
FIG. 1 is a diagram showing an example configuration of a computer system according to one embodiment.

FIG. 1 shows an example configuration of a computer system according to the embodiment.

A host computer 10 is connected to ports 111 and 112 of a storage system 11 that serves as an I/O device by a plurality of host bus adaptors (referred to as HBAs) 106 and 107 via multiplexed (redundant) I/O paths 113 and 114. The I/O path 113 serves as an operational path, and the I/O path 114 serves as a standby path. The host computer 10 can usually use the HBA 106 (operational path) to access a logical unit 115 generated in the storage system 11. If a failure occurs in the operational path, the host computer 10 can use the HBA 107 (standby path) to access the logical unit 115 in the storage system 11 via the standby I/O path 114 and the port 112. In this embodiment, each of the two HBAs 106 and 107 is formed of a PCI/PCIe-bus expansion card with a PCI PM capability. On each of the HBAs 106 and 107, the following units (not shown) are mainly mounted: a processor that executes a program to perform data transfer control; an LSI having a memory for storing various data and the program for the control; firmware that performs the entire control of the corresponding HBA; and an optical module that transmits and receives data to and from the corresponding port. In the figure, reference numerals 108 and 109 denote PM states.

Although a hardware configuration of the host computer 10 is not shown in the figure, the host computer 10 includes a processor that activates an OS (operating system) and also executes an application program 101, and a memory that stores various programs and data. The host computer 10 uses a host bus adaptor (HBA) driver 102.

The HBA driver 102 is a program executed by the processor to realize functions and has, as its inner functions, an adaptor driver common section 103, an adaptor control instance 104, and an adaptor control instance 105. The adaptor control instance 104 controls the HBA 106, and the adaptor control instance 105 controls the HBA 107. The adaptor driver common section 103 controls each of the adaptor control instances 104 and 105 independently to control data communication and also performs control such that the adaptor control instance 104 in the operational path is switched to the adaptor control instance 105 in the standby path.

In this embodiment, data communication is performed between the host computer 10 and the I/O device according to a SCSI standard, for example, based on a SCSI architecture model 4 described in Working Draft American National Standard Project T10/1683-D Rev. 6, 23 May 2006. When the application program 101 performs SCSI data communication with the logical unit 115 of the storage system 11, the adaptor driver common section 103 in the HBA driver 102 transmits a SCSI command via the I/O path 113, which passes through the HBA 106. Unless no response (that is, a data communication failure) occurs in the HBA 106 in the operational path, SCSI communication through the HBA 107 in the standby path is not performed.

Figure 2:
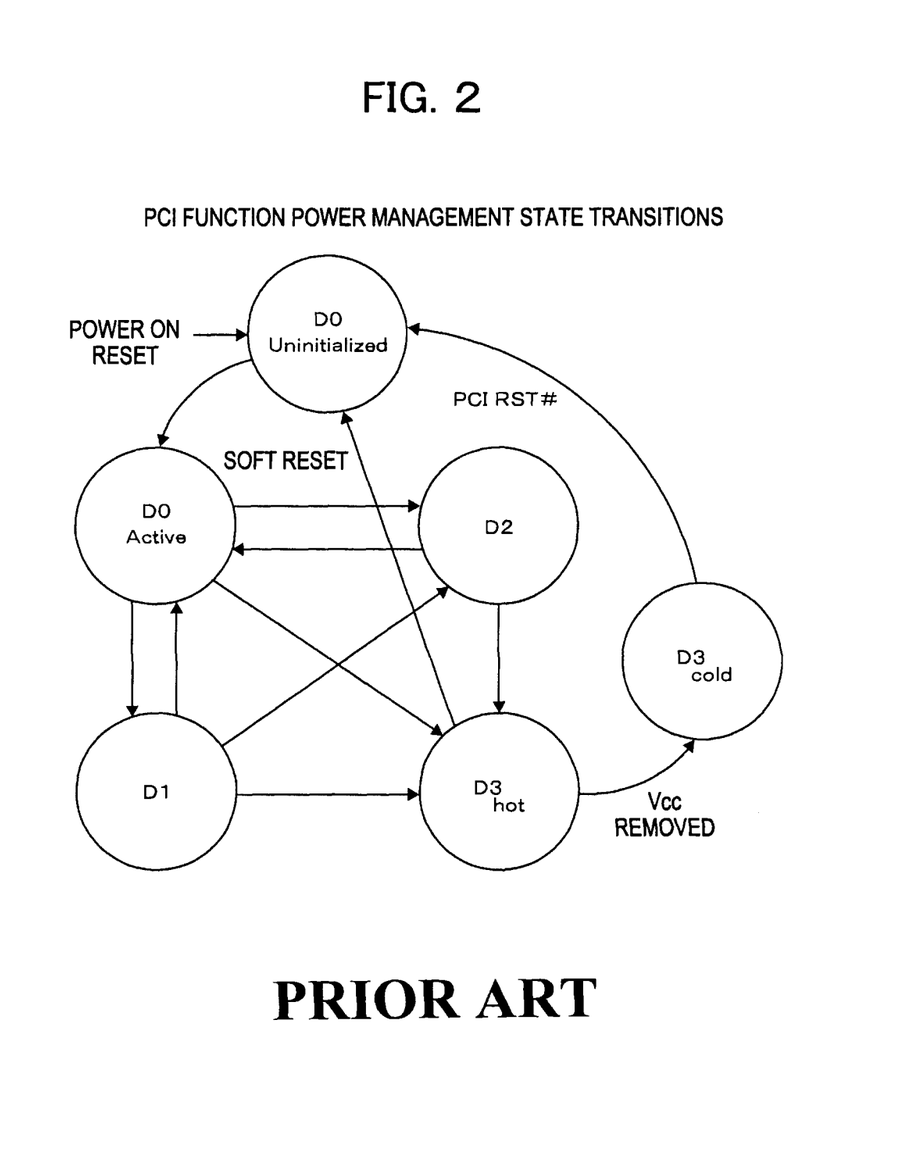
FIG. 2 is a diagram showing PCI function power management state transitions.

FIG. 2 shows PCI function power management state transitions according to page 45 in PCI Bus Power Management Interface Specification Rev. 1.2 Mar. 3, 2004.

In the embodiment of the present invention, power saving control for the standby path is performed while transition occurs among three states, i.e., D0 Unitialized, D0 Active, and D3_hot, shown in this transition diagram. In the D3-hot state, power is supplied, for example, to a connection bus circuit and a power management circuit in the HBA, a microprocessor and the LSI having the memory are in the stopped state, and power can be stopped thereto.

Figure 3:
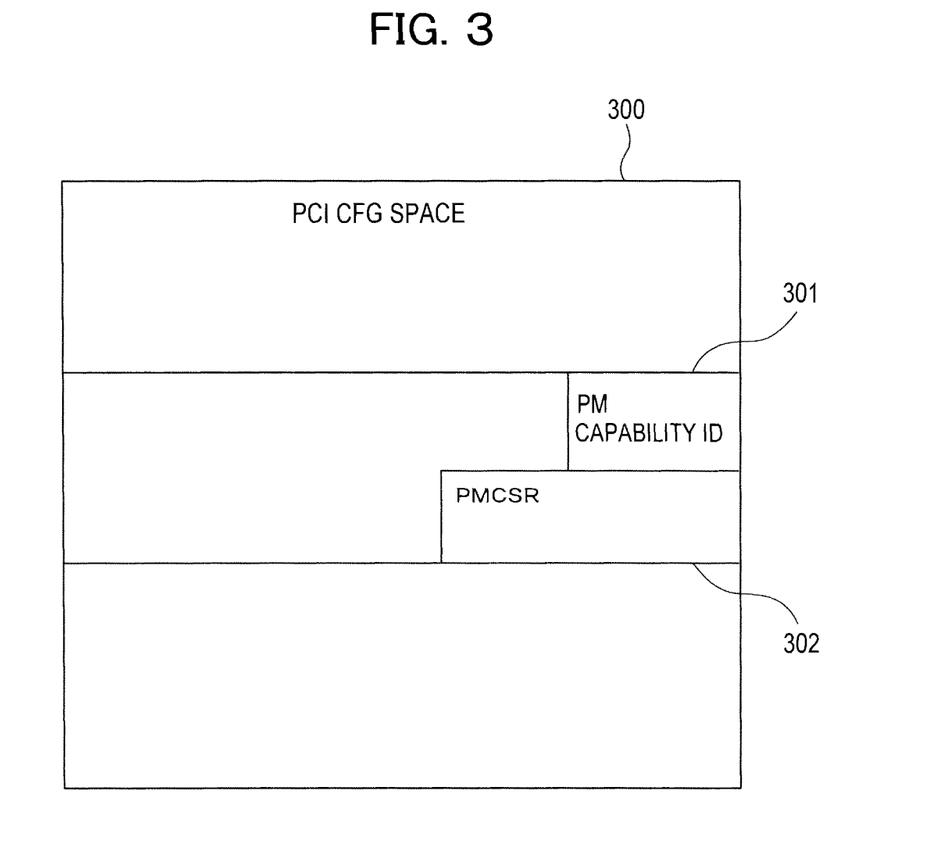
FIG. 3 is a diagram showing, in outline, a PCI CFG space.

FIG. 3 is a diagram showing, in outline, a PCI CFG space. Note that this is described in pages 21 to 24 in PCI Bus Power Management Interface Specification Rev. 1.2 Mar. 3, 2004.

The PCI CFG space is generated in the memory of each of the HBAs 106 and 107. A PCI CFG space 300 of each of the HBAs 106 and 107 includes a power management capability ID 301 and a power management control/status register (PMCSR) 302. The PMCSR 302 stores power-status bit information, and one of the three states, i.e., D0 Unitialized, D0 Active, and D3_hot, can be selected by rewriting the power-status bit information. Specifically, the adaptor control instance 104 rewrites the PMCSR 302 of the HBA 106 to switch the PCI PM state 108 of the HBA 106. Similarly, the adaptor control instance 105 rewrites the PMCSR 302 of the HBA 107 to switch the PCI PM state 109 thereof. The PCI PM state transitions in this embodiment are shown in FIG. 2.

When the host computer 10 is activated, control is performed such that the adaptor control instance 104 sets the PCI PM state 108 of the HBA 106 to "D0_Active", and the adaptor control instance 105 sets the PCI PM state 109 of the HBA 107 to "D3_hot". Specifically, "b11" is written in the PMCSR 302 of the HBA 107 to set the PCI PM state 109 to "D3_hot", thus causing the HBA 107 to enter a warm standby state. At this time, some of the functions are stopped in the HBA 107, thus reducing the power consumption, compared with the HBA 106 set in the "D0_Active" state. Specifically, in the HBAs 106 and 107 of this embodiment, when the PCI PM state 109 is set to "D3_hot", the function is stopped, the optical module for communication is turned off, a DMA transfer function is stopped, and a frame transmission and reception function is stopped. Thus, power saving can be achieved.

Next, command processing for the HBAs and power control actions performed by the HBA driver will be described with reference to FIGS. 4 and 5.

In the initial state, the PM state 108 of the HBA 106 is set to "D0 Active", and the PM state 109 of the HBA 107 is set to "D3 hot". It is assumed that the corresponding power-status bit information is registered in that way in the PMCSR 302 of the PCI CFG space 300. Furthermore, it is assumed that the adaptor control instance 104 for the operational path has a software timer used to monitor the time (time-out) of a response to a command or a request issued to the HBA 106.

Figure 4:
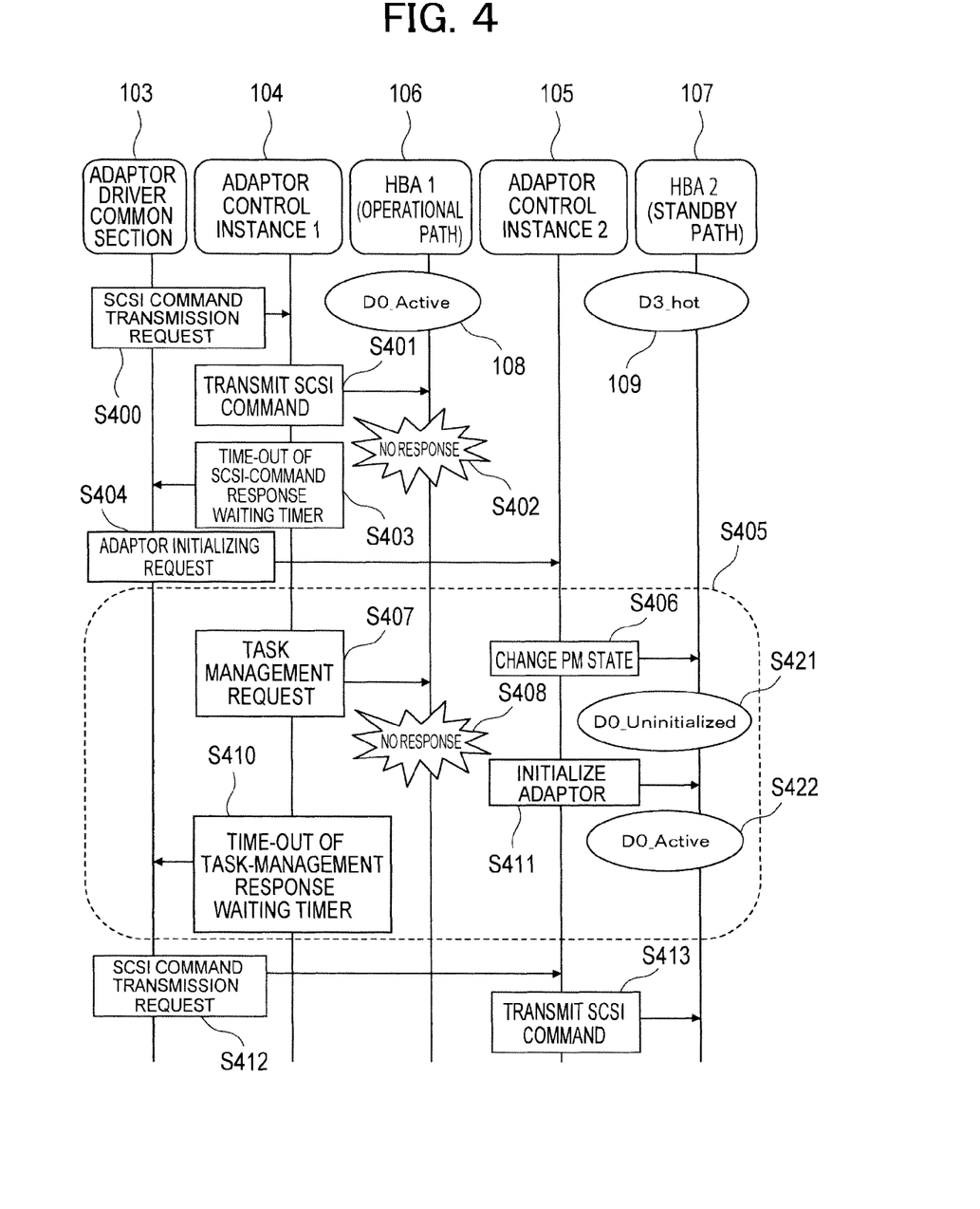
FIG. 4 is a sequence diagram showing command processing for HBAs and a power control action (control action 1), performed by an HBA driver according to the embodiment.

In FIG. 4, it is assumed that SCSI communication is attempted from the application program 101 to the logical unit 115 of the storage system 11. At this time, the adaptor driver common section 103 of the HBA driver 102 issues a SCSI command transmission request to the adaptor control instance 104 (S400).

When the SCSI command transmission request is received, the adaptor control instance 104 transmits a SCSI command to the HBA 106 (S401). It is assumed that, after the SCSI command is transmitted, no response is received from the HBA 106 (that is, a failure occurs therein) (S402). In this case, the adaptor control instance 104 detects the time-out of a SCSI-command response waiting timer (S403) and notifies the fact to the adaptor driver common section 103.

When the time-out of the SCSI-command response waiting timer is detected (S403), the adaptor control instance 104 issues a task management request to the HBA 106 in order to recover communication between the HBA 106 and the logical unit 115 (S407). Note that a task management request and processing related thereto in the SCSI architecture are described in SCSI Architecture Model 4 (pages 24 to 25 and 94 in Working Draft American National Standard Project T10/1683-D Rev. 6, 23 May 2006).

After the task management request is issued, if no response is received from the HBA 106 (S408), the adaptor control instance 104 detects the time-out of a task-management response waiting timer and notifies the fact to the adaptor driver common section 103 (S410).

When the adaptor driver common section 103 receives the notification of the time-out of the SCSI-command response waiting timer from the adaptor control instance 104 (S403), the adaptor driver common section 103 issues an adaptor initializing request to the adaptor control instance 105 (S404). When the adaptor initializing request is received, the adaptor control instance 105 writes power-status bit information "b00" in the PMCSR 302 of the HBA 107 in order to prepare for SCSI communication via the HBA 107. Then, the adaptor control instance 105 issues a PM state change to the HBA 107 (S406) to change the PCI PM state 109 of the HBA 107 to "D0_Uninitialized" (S421). Then, the adaptor control instance 105 initializes the HBA 107 (S411), and the HBA 107 enters the "D0_Active" state (S422). In this way, after those preparation processes (S406 and S411), the HBA 107 is capable of performing SCSI communication with the logical unit 115.

When the notification of the time-out of the task-management response waiting timer is received from the adaptor control instance 104 (S410) (that is, when the operational path, which includes the HBA 106, goes down), the adaptor driver common section 103 issues a SCSI command transmission request to the adaptor control instance 105 (S412). When the SCSI command transmission request is received (S412), the adaptor control instance 105 transmits a SCSI command to the HBA 107 (S413). Specifically, the SCSI command causes the HBA 107 in the standby path to access the logical unit 115 of the storage system 11.

According to this embodiment, if a response to the SCSI command (S401) issued by the adaptor control instance 104 is not returned from the HBA 106 (S403), the adaptor driver common section 103 immediately issues the adaptor initializing request to the adaptor control instance 105 (S404) to instruct it to change the PCI PM state of the HBA 107 to "D0_Uninitialized" (S421). Furthermore, the task-management-related processes (S407 and S410) performed by the adaptor control instance 104 and the preparations (S406 and S411) performed by the adaptor control instance 105 are concurrently carried out (during the period of S405 surrounded by a dotted line), thereby enabling the HBA 107 to perform SCSI communication (S412 and S413) with the storage system 11 immediately after the adaptor control instance 104 detects the time-out of the task-management response waiting timer (S410). Through this control action, SCSI communication via the standby path, which includes the HBA 107, can be immediately started.

The above-described example shown in FIG. 4 is a control action carried out when a task-management time-out response to the task management request issued by the adaptor control instance 104 is returned (S410) because a failure occurs in the HBA 106 (S408).

Figure 5:
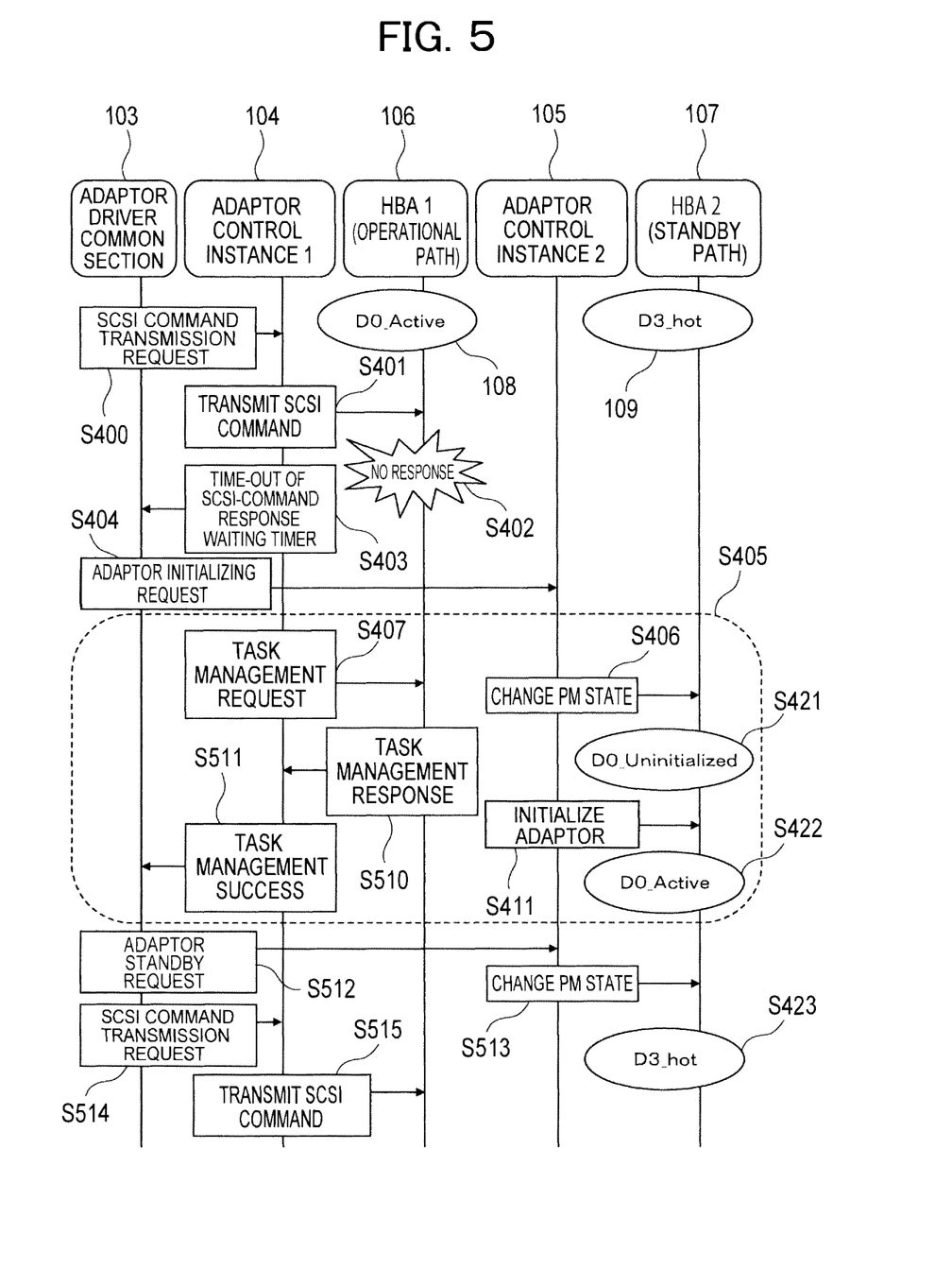
FIG. 5 is a sequence diagram showing command processing for the HBAs and a power control action (control action 2), performed by the HBA driver according to the embodiment.

In contrast, an example shown in FIG. 5 is a control action carried out when a failure in the HBA 106 is not detected, and the task management with respect to the task management request issued by the adaptor control instance 104 ends successfully.

In FIG. 5, when a task management response to the task management request is received (S510), the adaptor control instance 104 notifies a task management success to the adaptor driver common section 103 (S511).

When the task management success is received, the adaptor driver common section 103 issues an adaptor standby request to the adaptor control instance 105 (S512). Then, the adaptor driver common section 103 attempts SCSI communication with the HBA 106 set in the normal state. Specifically, the adaptor driver common section 103 issues a SCSI command transmission request to the adaptor control instance 104 (S514), and the adaptor control instance 104 transmits a SCSI command to the HBA 106 (S515).

When the adaptor standby request is received, the adaptor control instance 105 changes the PM state of the HBA 107 (S513). Specifically, the adaptor control instance 105 writes "b11" in the PMCSR 302 of the HBA 107 to set the PCI PM state to "D3_hot" (109) (S423), thereby making the HBA 107 enter the standby state.

As described above, according to this embodiment, when the adaptor control instance 104 receives the task management response to the task management request, the HBA 107 can be set in the warm standby state again. Thus, power saving can be continued.

What is claimed is:

1. A computer system that performs data communication with an I/O device via host bus adaptors (HBAs) connected to the I/O device, the computer system comprising:
   a first HBA that constitutes an operational path and on which a first PCI/PCIe-bus expansion card having a PCI PM function serving as a power saving function is mounted, and a second HBA that constitutes a standby path and on which a second PCI/PCIe-bus expansion card having the PCI PM function is mounted;
   a control section that is configured to control the first HBA and the second HBA, wherein the control section is configured to first performs control such that the first PCI/PCIe-bus expansion card of the first HBA is set to an active state and the second PCI/PCIe-bus expansion card of the second HBA is set to a power saving state;

wherein, when a failure occurs in the operational path, the control section is configured to:

perform a communication recovery process for the operational path applied to the first HBA, wherein the communication recovery process comprises: sending a task management request to the first HBA and receiving the response of the task management request from the first HBA, and further perform changing the second PCI/PCIe-bus expansion card from the power saving state to an active state; and when the communication recovery processing ends unsuccessfully, the control section is configured to perform control such that communication is made with the I/O device by using the second PCI/PCIe-bus expansion card of the second HBA, wherein the control section is configured to perform the changing before receiving the response of the task management request.

2. The computer system according to claim 1, further comprising a host computer that performs data communication with the I/O device by using a SCSI command;

wherein the control section is configured to concurrently perform the control of the communication recovery processing for the operational path and the control for changing the state of the standby path from the power saving state to the active state.

3. The computer system according to claim 1, wherein, when a failure in the operational path is detected, the control section is configured to issue a task management request in the communication recovery processing for the operational path and activates the second HBA in the standby path, concurrently; and when the task management request with respect to the operational path ends unsuccessfully, the control section is configured to perform communication with the I/O device via the second HBA by using a SCSI command.

4. The computer system according to claim 2, wherein the control section is configured to set a PM state of the first PCI/PCIe-bus expansion card of the first HBA in the operational path to D0_Active;

the control section is configured to set a PM state of the second PCI/PCIe-bus expansion card of the second HBA in the standby path to D3_hot;

the control section is configured to perform communication with the I/O device via the first PCI/PCIe-bus expansion card of the first HBA in the operational path;

when a problem occurs in the communication using the SCSI command via the operational path, the control section is configured to concurrently perform the control of the communication recovery processing for the operational path and the control for changing the PM state of the second HBA in the standby path to D0_Active; and when the communication recovery processing for the operational path ends unsuccessfully, the control section is configured to perform communication with the I/O device by using the second PCI/PCIe-bus expansion card of the second HBA.

5. The computer system according to claim 4, wherein, when a problem occurs in the communication using the SCSI command via the operational path, the control section is configured to concurrently perform the control of the communication recovery processing for the operational path and the control for changing the PM state of the second HBA in the standby path to D0_Active;

when the communication recovery processing for the operational path ends successfully, the control section is configured to change the PM state of the second PCI/PCIe-bus expansion card of the second HBA from D0_Active to D3_hot; and the control section is configured to further perform communication with I/O device with a SCSI command by using the first PCI/PCIe-bus expansion card of the first HBA.

6. A host bus adaptor (HBA) control method used in a host computer that performs data communication with an I/O device by using a SCSI command via host bus adaptors (HBAs) connected to the I/O device, the host computer including: as the HBAs, a first HBA that constitutes an operational path and on which a first PCI/PCIe-bus expansion card having a PCI PM function serving as a power saving function is mounted, and a second HBA that constitutes a standby path and on which a second PCI/PCIe-bus expansion card having the PCI PM function is mounted; and a control section that is configured to control the first HBA and the second HBA, the method comprising the steps of:

first performing control, with the control section, such that the first PCI/PCIe-bus expansion card of the first HBA is set to an active state and the second PCI/PCIe-bus expansion card of the second HBA is set to a power saving state;

wherein, when a failure occurs in the operational path, performing control, with the control section, using a communication recovery process for the operational path applied to the first HBA, wherein the communication recovery process comprises: sending a task management request to the first HBA and receiving the response of the task management request from the first HBA, and further performing changing the second PCI/PCIe-bus expansion card from the power saving state to an active state; and when the communication recovery processing ends unsuccessfully, performing control, with the control section, such that communication is made with the I/O device by using the second PCI/PCIe-bus expansion card of the second HBA, wherein the control section is configured to perform the changing before receiving the response of the task management request.

7. The host bus adaptor (HBA) control method according to claim 6, wherein, when a failure in the operational path is detected, issuing by the control section a task management request in the communication recovery processing for the operational path and activating the second HBA in the standby path, concurrently; and when the task management request with respect to the operational path ends unsuccessfully, the control section performing communication with the I/O device via the second HBA by using a SCSI command.

8. The host bus adaptor (HBA) control method according to claim 6, setting by the control section a PM state of the first PCI/PCIe-bus expansion card of the first HBA in the operational path to D0_Active;

setting by the control section a PM state of the second PCI/PCIe-bus expansion card of the second HBA in the standby path to D3_hot;

performing by the control section communication with the I/O device via the first PCI/PCIe-bus expansion card of the first HBA in the operational path;

when a problem occurs in the communication using the SCSI command via the operational path, currently performing by the control section the control of the communication recovery process for the operational path and the control for changing the PM state of the second HBA in the standby path to D0_Active; and when the communication recovery processing for the operational path ends unsuccessfully, performing by the control section communication with the I/O device by using the second PCI/PCIe-bus expansion card of the second HBA.

9. The host bus adaptor (HBA) control method according to claim 8, wherein, when a problem occurs in the communication using the SCSI command via the operational path, concurrently performing by the control section the control of the communication recovery processing for the operational path and the control for changing the PM state of the second HBA in the standby path to D0_Active;

when the communication recovery processing for the operational path ends successfully, changing by the control section the PM state of the second PCI/PCIe-bus expansion card of the second HBA from D0_Active to D3_hot; and further performing by the control section communication with I/O device with a SCSI command by using the first PCI/PCIe-bus expansion card of the first HBA.

10. The host bus adaptor (HBA) control method according to claim 8, wherein the PM states of the first and second HBAs are changed by rewriting registers (PMCSRs) in PCI CFG spaces generated on memories mounted on the first and second PCI/PCIe-bus expansion cards.

11. A non-transitory computer readable medium storing a computer-readable program functioning as a host-bus-adaptor driver, executed on a host computer and controlling a first host bus adaptor (HBA) and a second HBA that are connected to an I/O device, the host computer including the first HBA that constitutes an operational path and on which a first PCI/PCIe-bus expansion card having a PCI PM function serving as a power saving function is mounted, and the second HBA that constitutes a standby path and on which a second PCI/PCIe-bus expansion card having the PCI PM function is mounted, and the host computer performing data communication with the I/O device using a SCSI command via the first HBA or the second HBA, comprising:

computer-readable instructions to first perform by the host-bus-adaptor driver control such that the first PCI/PCIe-bus expansion card of the first HBA is set to an active state and the second PCI/PCIe-bus expansion card of the second HBA is set to a power saving state;

when a failure occurs in the operational path, computer readable instructions to perform by the host-bus-adaptor driver control, using communication recovery process for the operational path is applied to the first HBA, wherein the communication recovery process comprises: sending a task management request to the first HBA and receiving the response of the task management request from the first HBA, and computer readable instructions to change the second PCI/PCIe-bus expansion card of the second HBA from the power saving state to an active state before receiving the response of the task management request; and when the communication recovery processing ends unsuccessfully, computer readable instructions to perform by the host-bus-adaptor driver control such that communication is made with the I/O device by using the second PCI/PCIe-bus expansion card of the second HBA.

* * * * *